(12) United States Patent
Möbius et al.

(10) Patent No.: US 6,437,473 B1
(45) Date of Patent: Aug. 20, 2002

(54) ELECTRIC MOTOR ROTOR AND A METHOD FOR PRODUCING AN ELECTRIC MOTOR ROTOR

(75) Inventors: Marcos Romeu Möbius; Luiz Von Dokonal; Claudio Werner De Lima, all of Joinville-SC (BR)

(73) Assignee: Empresa Brasileira de Compressores S.A. - Embraco, Joinville-SC (BR)

( * ) Notice: Subject to any disclaimer, the term of this patent is extended or adjusted under 35 U.S.C. 154(b) by 0 days.

(21) Appl. No.: 09/509,292
(22) PCT Filed: Sep. 25, 1998
(86) PCT No.: PCT/BR98/00086
§ 371 (c)(1),
(2), (4) Date: Jun. 6, 2000
(87) PCT Pub. No.: WO99/17420
PCT Pub. Date: Apr. 8, 1999

(30) Foreign Application Priority Data

Sep. 26, 1997 (BR) .............................. 9705579

(51) Int. Cl.⁷ ................... H02K 21/12; H02K 15/02; H02K 15/00
(52) U.S. Cl. ................ 310/156.21; 310/156.23; 310/156.53; 310/42; 29/598
(58) Field of Search ............... 29/598; 310/156.08, 310/156.21, 156.23, 156.48, 156.49, 156.51, 156.52, 156.53, 156.54, 156.55, 156.56, 216, 217, 218, 154.07, 154.11, 156.27, 156.31, 42

(56) References Cited

U.S. PATENT DOCUMENTS

| | | | |
|---|---|---|---|
| 4,103,195 A | * 7/1978 | Torossian et al. ............ 310/259 |
| 4,434,546 A | * 3/1984 | Hershberger ............... 29/598 |
| 4,469,970 A | 9/1984 | Neumann | |
| 4,486,679 A | * 12/1984 | Jones ......................... 310/218 |
| 4,631,807 A | * 12/1986 | Kawada et al. .............. 29/598 |
| 4,792,712 A | * 12/1988 | Stokes ....................... 310/156 |
| 4,845,837 A | * 7/1989 | Lloyd ........................ 29/598 |
| 5,191,256 A | * 3/1993 | Reiter, Jr. et al. .......... 310/156 |
| 5,363,004 A | * 11/1994 | Futami et al. .............. 310/156 |
| 5,936,323 A | * 8/1999 | Shibukawa et al. ......... 310/156 |
| 5,945,760 A | * 8/1999 | Honda et al. ............... 310/156 |
| 6,072,256 A | * 6/2000 | Shon et al. ................. 310/156 |

FOREIGN PATENT DOCUMENTS

| | | | |
|---|---|---|---|
| DE | 1 488 733 | 6/1969 | |
| EP | 0 265 364 | 4/1988 | ......... H02K/15/02 |
| EP | 0 558 746 | 9/1993 | ........... H02K/1/27 |

* cited by examiner

Primary Examiner—Nicholas Ponomarenko
Assistant Examiner—Dang Dinh Le
(74) Attorney, Agent, or Firm—Darby & Darby

(57) ABSTRACT

A method of producing the core of an electric motor by providing a stack of laminations of magnetic material. Windows are formed in the laminations for one or more magnetic elements to be placed in each window. Each window has an end edge portion (17) which is to be at the peripheral edge (18) of the lamination of the finished version of the rotor. The laminations originally have an annular radial extension (60–61) and after the core is assembled with end caps, the annular radial extension (60–61) is removed so that the window end edge portions (17) are at the periphery (18) of the laminations. There is a polar peripheral portion (20) between each window and the periphery (18) of the lamination and an intermediate peripheral portion (40) between two adjacent polar peripheral portions, with such intermediate polar portions having reduced electrical conductibility and reduced magnetic permeability.

4 Claims, 4 Drawing Sheets

ELECTRIC MOTOR ROTOR AND A METHOD FOR PRODUCING AN ELECTRIC MOTOR ROTOR

FIELD OF THE INVENTION

The present invention refers to a construction of a brushless electric motor rotor and to a method for producing said rotor, carrying magnet elements which are internally circumferentially arranged and radially spaced from the lateral surface of the rotor.

BACKGROUND OF THE INVENTION

In he construction of a brushless electric motor rotor, the permanent magnet elements are affixed to the core of said rotor to be concentrically mounted around the motor shaft. In this construction, the rotor is formed by longitudinally aligning a plurality of mutually overlapped metallic laminations defining a lamination stack, each metallic lamination having a plurality of circumferentially aligned windows which are angularly equidistant from each other and from the motor shaft, said windows being aligned to respective windows of the other metallic laminations of the lamination stack, in order to define axial housings into which the magnet elements are mounted and affixed.

In the prior art construction, each metallic lamination of the rotor lamination stack has a central portion provided with a central opening to be mounted to the motor shaft, and radially end portions, each defined externally to a respective window of the metallic lamination and incorporated to the central portion from the regions thereof located outside two consecutive windows.

In his prior art construction, the windows of each rotor lamination are defined so that the respective end edges are turned towards the peripheral edge of the respective rotor lamination, in a spaced position from said peripheral edge of the lamination, in order to define therein a structural annular region connecting two adjacent radially end portions to each other and to the central portion of the lamination through the spacing existing between the adjacent end edges of two consecutive windows.

The existence of a structural annular region permits the use of metallic laminations produced in a single piece and having windows which, posteriorly, with the formation o the rotor lamination stack, will define axial housings for the magnet elements.

While this known construction for a metallic lamination is adequate to be manufactured on a large scale, relatively easer to carry out, of low cost and which results in a highly reliable product, it has the deficiency of permitting losses of useful magnetic flow to occur, which fact is incompatible with the application to which the rotor is designed.

With this construction, only part of the total magnetic field of the rotor generated by the magnets interacts with the magnetic field of the stator, whereas the remaining of said total field is lost in the form of a dispersion field of both the rotor and the air gap. The rotor field losses occur due to the presence of steel with a structural function in the rotor lamination An the magnet end region. This region serves as a pathway to the flow lines of the dispersion field, which represent a non-used amount of the total field of the rotor.

DISCLOSURE OF THE INVENTION

Thus, it is an objective of the present invention to provide an electric motor rotor and a method for producing an electric motor rotor, which eliminates the magnetic flow losses due to the rotor dispersion field, has high energetic efficiency and high reliability, and which may be obtained with an easy, economical and industrially viable construction, without impairing the integrity and strength of the rotor.

These and other objectives are achieved by an electric motor rotor, comprising: a core, formed by a plurality of metallic laminations, which are axially and mutually overlapped and which are made from a magnetic material; polar peripheral portions in a magnetic material and affixed around the core; and an equal number of magnet elements, retained between the polar peripheral portions and the core, said rotor comprising a cylindrical lateral surface defined by the polar peripheral portions, which are circumferentially spaced from each other, and by intermediate peripheral portions provided between each two adjacent polar peripheral portions, said intermediate peripheral portions having throughout their longitudinal extensions reduced electrical conductibility and reduced magnetic permeability in relation to the core, at least in the regions connecting two adjacent polar peripheral portions, said rotor further comprising a pair of end caps for retaining the polar peripheral portions to the core. The present invention further comprises a method for producing an electric motor rotor of the type mentioned above, comprising the following steps: a providing each metallic lamination with a plurality; of windows, each window having end edges turned towards a peripheral edge of the respective metallic lamination, with the end edges of all the windows being contained in the same circumference; b- providing each metallic lamination, from its peripheral edge and at least in the regions radially aligned with the adjacent end edges of each two consecutive windows, with a respective radial extension, which is coplanar and external to said peripheral edge; c- overlapping the metallic laminations, defining over an end cap a lamination stack, so that each window of said laminations be axially aligned with respective windows of the other metallic laminations, defining, with the end cap, axial housings along the rotor; d- inserting an adhesive material into the axial housings; e- inserting into each axial housing a magnet element: f- mounting and affixing another end cap to the lamination stack, already retaining each magnet element to the respective axial housing: q- curing the adhesive material, retaining each magnet element to the respective axial housing; and h- removing each said radial extension, so that the peripheral edge of the metallic laminations defines the transversal contour of the finished rotor.

BRIEF DESCRIPTION OF THE DRAWINGS

The invention will be described below, with reference to the attached drawings, in which:

FIG. 7 shows, schematically and partially, an enlarged plan view of part of the metallic lamination illustrated in FIG. 2 and shown as det. a.

BEST MODE OF CARRYING OUT THE INVENTION

Figure 2:
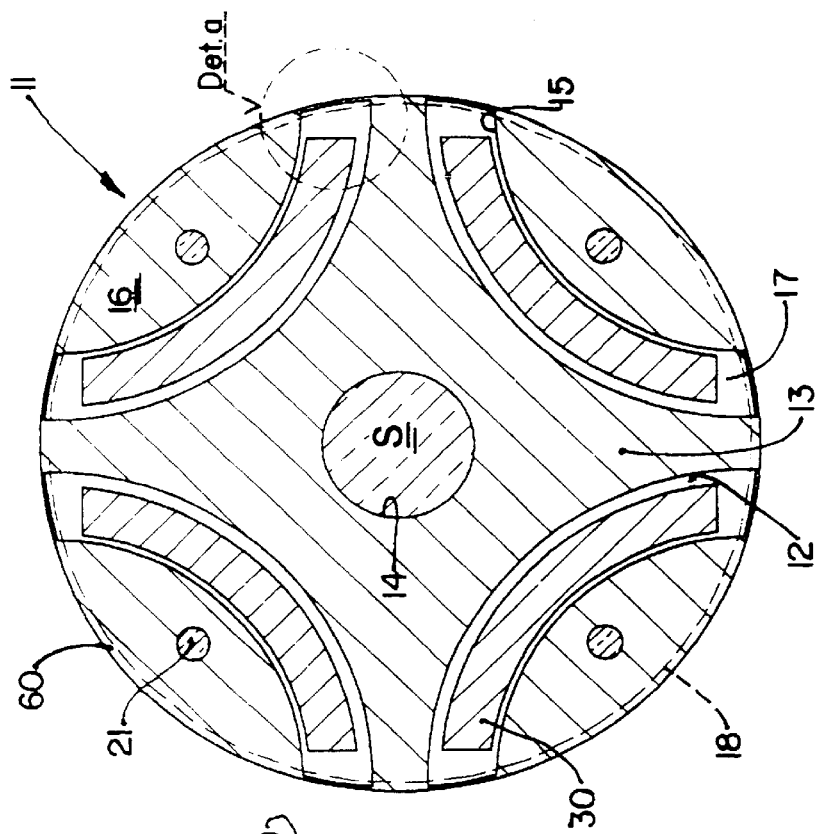
FIG. 2 shows, schematically, a cross-sectional view of the rotor mounted with a metallic lamination of the rotor lamination stack, constructed according to a first embodiment of the present invention and in a non-finished rotor condition.

According to the figures, the electric motor rotor of the present invention comprises a core 10, defined by a plurality of metallic laminations 11 in a magnetic material, such as steel, which have a determined electrical conductibility and a determined magnetic permeability, and which are mutually concentric and overlapped, forming a lamination stack to be affixed around an extension of the shaft S of the motor, and polar peripheral portions 20 affixed around the core 10. Between each said polar peripheral portion 20 and the core 10 is defined an axial housing 12, which occupies the whole longitudinal extension of the rotor and into which is retained a respective magnet element 30, said magnets being usually in the form of longitudinal plates, which are for example arcuated (or rectilinear) and which are placed according to a same circumferential alignment and spaced from each other.

According to the prior art, each metallic lamination 11 has a central portion 13 provided with a central opening 14 to be mounted to the shaft S of the motor, windows 15, which are defined according to the same circumferential alignment and which are angularly equidistant from each other and from the shaft S of the motor, and radially end portions 16, each defined externally to a respective window 15 and incorporated to the central portion 13 by the regions thereof between each two adjacent windows 15.

The windows 15 of each rotor lamination have respective end edges 17 circumferentially contained in the same circumference and facing a peripheral edge 18 of the respective metallic lamination 11 which defines the contour of the cross-section of the finished rotor.

The overlapping of the metallic laminations 11, in order to form the lamination stack, is carried out so is that the windows 15 of each metallic lamination 11 be aligned with the respective windows 15 of the other metallic laminations 11 of the lamination stack, defining the axial housings 12 to allow the assembly and fixation of the magnet elements 30. Upon formation of the lamination stack, each axial alignment of the radially end portions 16 defines a respective polar peripheral portion 20.

The magnet elements 30 are retained to the core 10 by an interface of a retaining adhesive material, for example a curable polymeric material, which fills in the gaps existing between each magnet element 30 and the respective axial housing 12. The adhesive material has low electrical conductibility and also low magnetic permeability, in relation to the same characteristics of electrical conductibility and magnetic permeability of the core.

Figure 1:
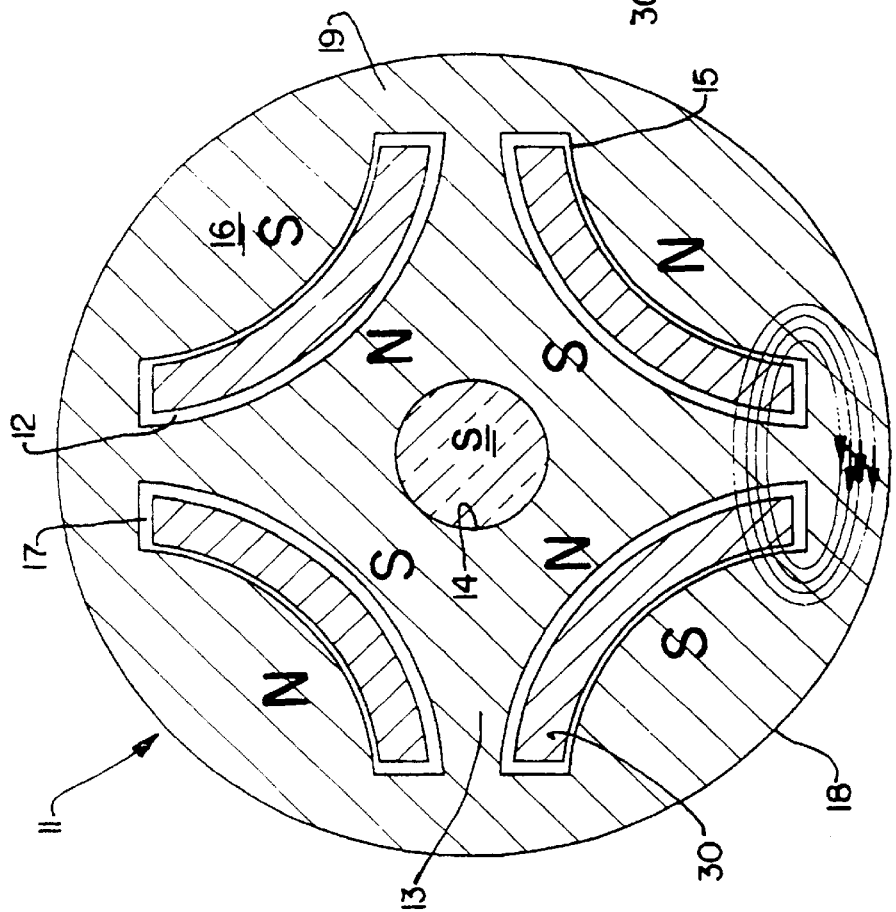
FIG. 1 illustrates, schematically, a cross-sectional view of the rotor mounted with a metallic lamination of the rotor lamination stack, constructed according to the prior art.

According to the illustration in FIG. 1, the prior art construction has the end edges 17 of the windows 15 of each metallic lamination 11 contained in a circumferential alignment internally defined in relation to that alignment containing the peripheral edge 18 of the metallic lamination 11 in a position spaced from said peripheral edge 18, in order to define therein a structural annular region 19 connecting two adjacent radially end portions 16 of each metallic lamination 11 to each other and to the central portion 13 thereof by the spacing existing between the adjacent end edges of two consecutive windows 15. In this construction, the lamination stack defines the rotor cylindrical lateral surface, which is metallic throughout its axial extension. The structural annular region 19 provides a structural connection, which is sufficient to resist the centrifugal forces on the magnet mass and on the mass of the steel material existing on the magnets, but which permits the occurrence, in this region, of magnetic flow lines which result in the losses due to dispersion field discussed above.

In order to solve the problems of magnetic flow losses due to the dispersion field existing in the prior art, the rotor of the present invention is constructed in such a way that, when finished, the laminations of its lamination stack have no more the respective structural annular region 19 connecting each two end regions 16. This rotor has, at least in this finished condition, a cylindrical lateral surface with metallic regions, which are circumferentially intercalated by regions comprising, throughout its longitudinal extension, reduced electrical conductibility and reduced magnetic permeability, as compared to the steel which forms the core.

According to the present invention, the cylindrical lateral surface of the rotor is defined so that each two polar peripheral portions 20 be circumferentially intercalated by an intermediate peripheral portion 40 having, at least in the regions connecting two adjacent peripheral portions 20, reduced electrical conductibility and reduced magnetic permeability in relation to the core 10. The intermediate peripheral portions 40 comprise end regions 41, which connect the adjacent polar peripheral portions 20, and a median region 42.

Figure 4:
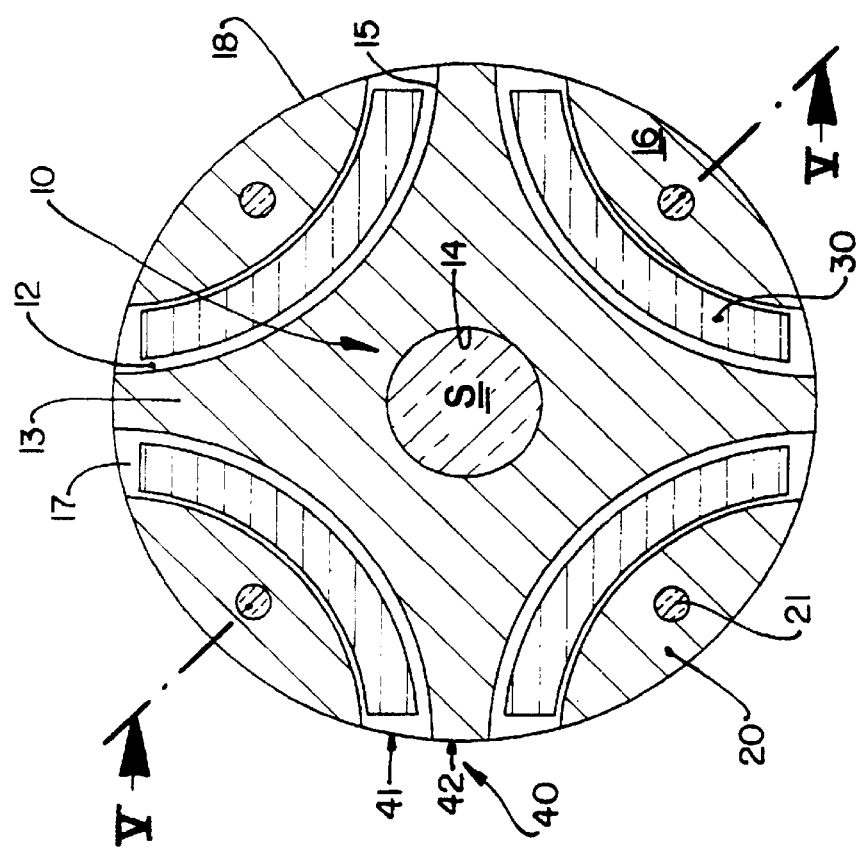
FIG. 4 shows, schematically, an enlarged cross-sectional view of the already finished rotor.

According to the present invention, each end region 41 of an intermediate peripheral portion 40 is defined by the circumferential spacing between the respective median region 42 and the adjacent polar peripheral portions 20, said median region 42 being defined, for instance, by a respective peripheral portion of the core 10 circumferentially spaced from the adjacent polar peripheral portions 20, each end region 41 being defined by the end of an axial housing 12 of a magnet element 30 filled in with the adhesive material for retaining said magnet elements 30 (FIG. 4). This adhesive material is a retaining agglomerating means, such as resin, rubber, etc., which involves the magnet elements, avoiding the eventual release of chips therefrom, and which provides finish to the lateral surface of the finished rotor at the end region 41.

Figure 3:
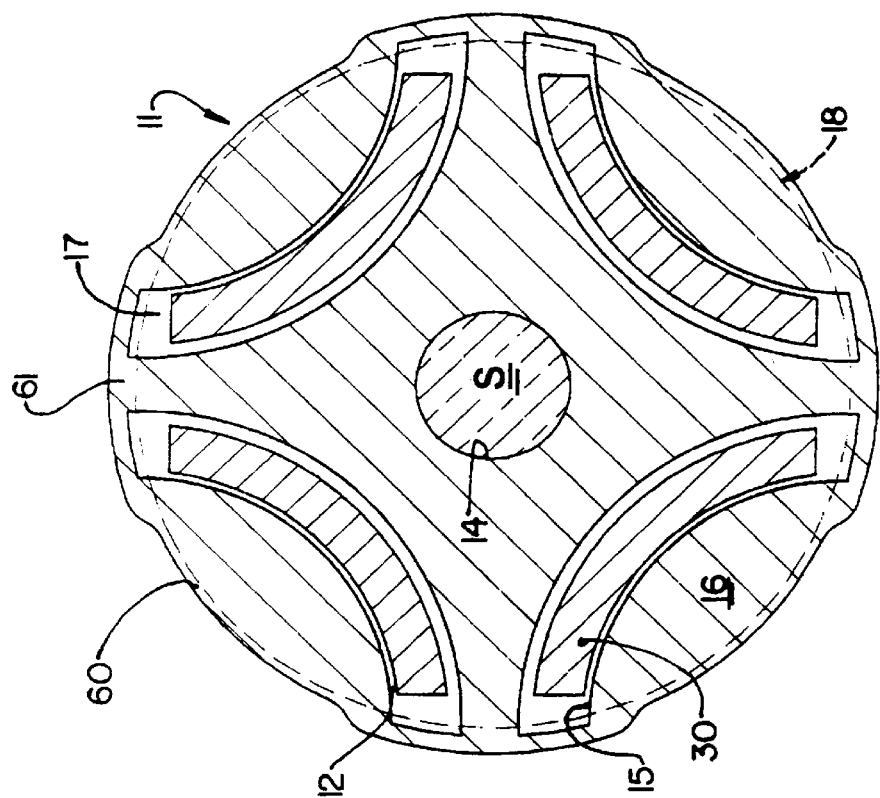
FIG. 3 shows, schematically, a cross-sectional view of the rotor mounted with a metallic lamination of the rotor lamination stack, constructed according to a second embodiment of the present invention and in a non-finished rotor condition.
Figure 5:
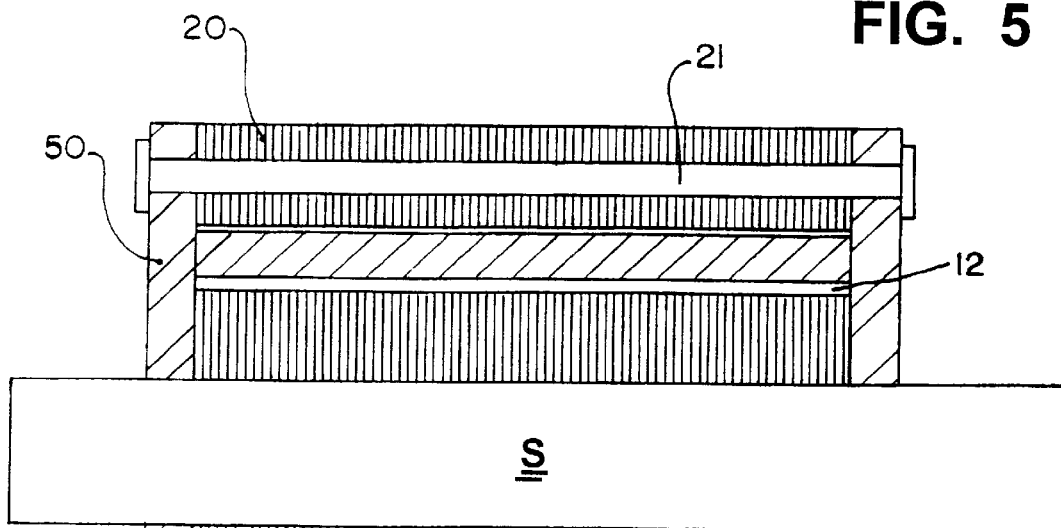
FIG. 5 shows, schematically and in longitudinal view according to line V—V of FIG. 4, an already finished rotor, obtained according to one of the first and second embodiments of the present invention.

For producing the rotor of the present invention, the lamination stack is formed by seating a first metallic lamination 11 of this lamination stack onto an end cap 50 of a pair of end caps 50 which form the rotor. This seating preferably occurs by resin being applied onto an upper face of the end cap 50 located under the lamination stack of the rotor. The end caps 50 are obtained from a material with non-magnetic characteristics, in order to eliminate or minimize, in said caps, the magnetic field due to dispersion and passing through said caps and the consequent losses. According to a constructive form of the present invention, as illustrated in FIGS. 2, 3 and 5, the finished rotor comprising a core 10 and polar peripheral portions 20 is produced with a stack of stamped metallic laminations 11 incorporating from the peripheral edge 18 thereof, at least in the regions which are radially aligned with the adjacent end edges 17 of each two consecutive windows 15, a radial extension 60, which is coplanar and external to said peripheral edge 18 and which is inscribed in a circumference which is concentric and external in relation to that containing said end edges 17 which, in the present embodiment, surpass radially the peripheral edge 18 of the respective rotor lamination in the region of the corresponding radial extension 60. The radial extensions 60 may have any shape. In the embodiment in which the metallic lamination 11 is square, said regions are defined by the vertex portions of said laminations. The dimensioning of the metallic laminations 11 is determined so that said laminations are shaped having the internal diameter of the stator, as it occurs with the metallic lamination illustrated in FIG. 2, or in such a way as to use a smaller quantity of raw material in the stamping process thereof. In this case, the metallic lamination 11 has its shape limited by a polygon, for example a square, whose sides are tangent to the excess material external to the peripheral edge 18.

According to the illustrations of FIGS. 2 and 3, each rotor lamination is shaped so as to have a single radial extension 60, which is annular and continuous and which determines a rotor lamination with a larger diameter than the nominal diameter of the already finished rotor.

The thickness of each radial extension 60 is calculated to guarantee integrity to the metallic laminations 11 during their manufacture and formation of the lamination stack and during rotor machining, without causing high losses in the material which forms the laminations.

In a constructive option illustrated in FIG. 3, the single radial extension 60 incorporates in each region radially aligned with the adjacent end edges 17 of each two consecutive windows 15, an additional reinforcement portion 61, which is radial, coplanar and external in relation to said single radial extension 60.

Figure 6:
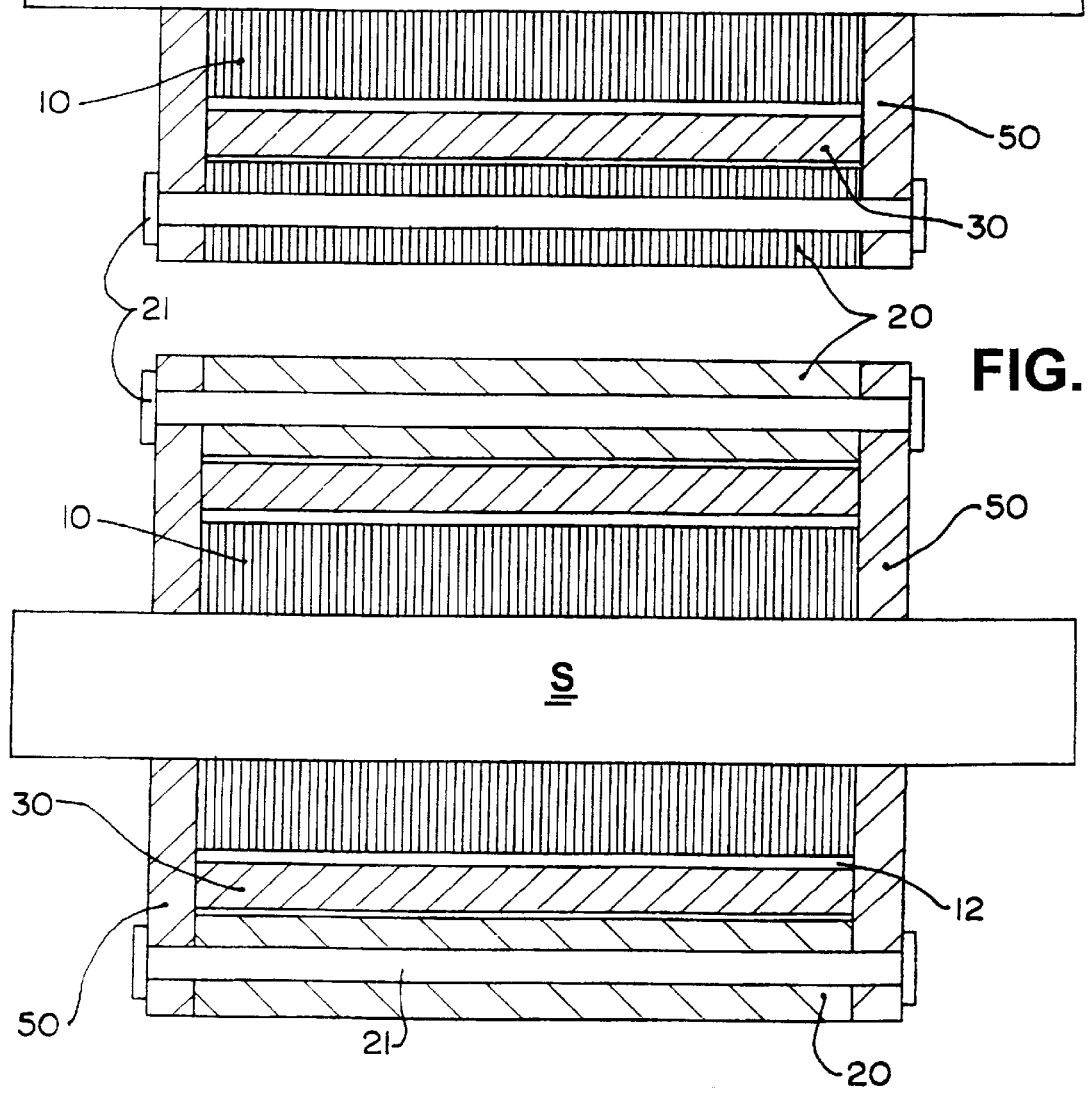
FIG. 6 shows, schematically and in longitudinal view according to line V—V of FIG. 4, an already finished rotor, obtained according so another embodiment of the present invention.
Figure 7:
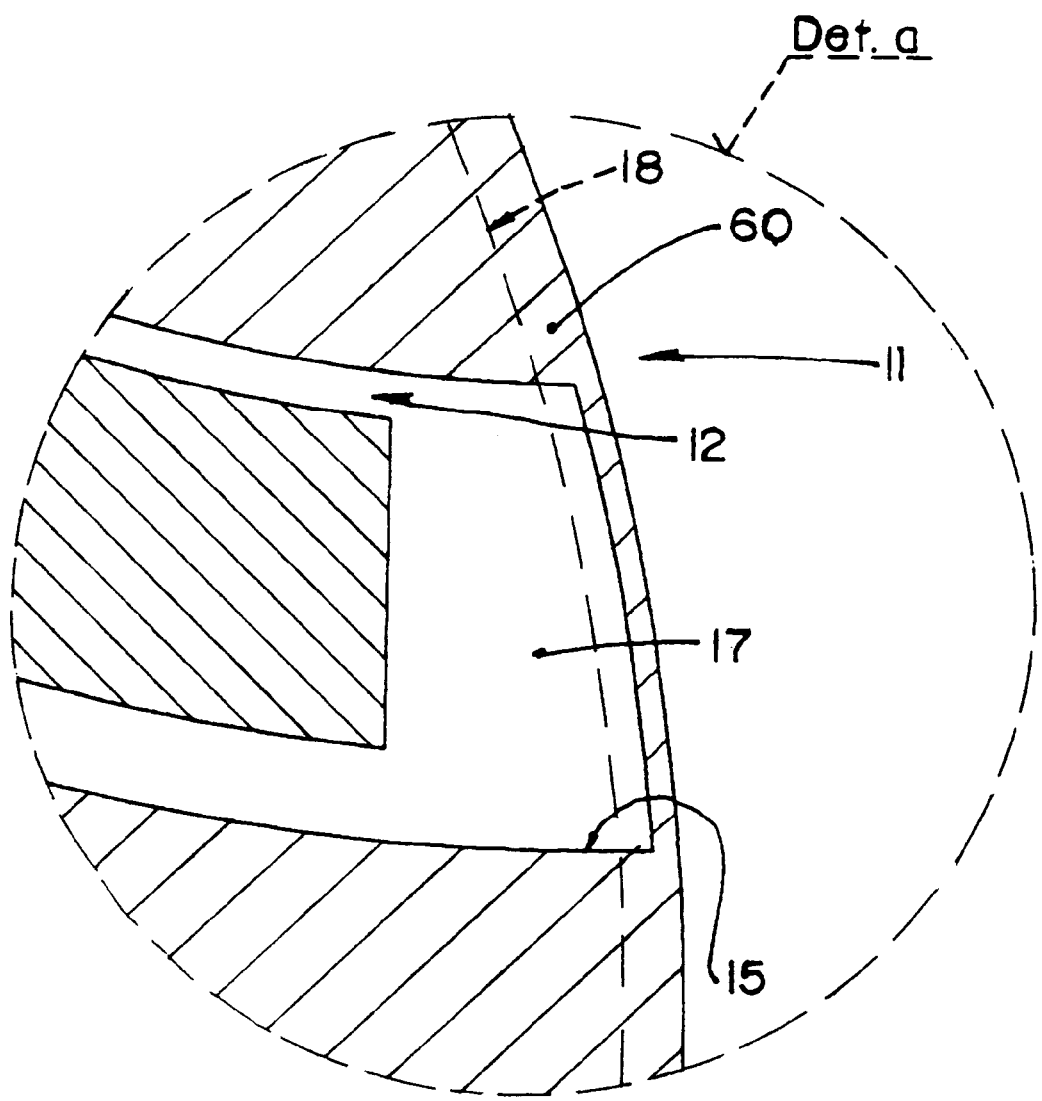

According to another form of carrying out the present invention, illustrated in FIG. 6, the core 10 is produced bad a lamination stack, each metallic lamination 11 being stamped so as to have the respective peripheral edge 18 shaped to define a radially internal edge of a respective axial housing 12 for a magnet element 30. In this embodiment, the radially external edge of each said axial housing 12 is defined by the radially internal edge of a respective polar peripheral portion 20, which is radially mounted spaced from the core 10, after the formation of the latter, in order to. define, in this spacing, an axial housing 12 to be filled with the adhesive material for retaining the respective magnet element 30.

According to this embodiment, after the formation of the rotor lamination stack, adjacently and spaced from each portion of the peripheral edge of this stack, is mounted a respective polar peripheral portion 20, in the form of a massive shoe or consisting of superposed laminations, which are attached to each other, for example, by gluing, riveting, bolting, etc. In this embodiment, the shoes are individually mounted and affixed to the rotor by retaining elements 21 (bolts, rivets, gluing between each support and the caps, etc., positioned in a place which minimizes the losses caused by hysteresis and Foucault current), extending longitudinally through the respective polar peripheral portion 20 to a pair of end caps 50, each cap being mounted adjacently to a metallic lamination 11 provided at one of the ends of the lamination stack. In order to form each axial housing 12 provided with shoes, it is necessary to use a mold or a device to determine the shape of the end walls of each said housing, so as to retain the adhesive material for affixing said magnet elements 30 in these housings. According to the rotor embodiment illustrated in FIGS. 2–5, in order to form the rotor lamination stack, after superposing the metallic laminations 11 (and eventually gluing one to the other, which minimizes losses due to hysteresis and Foucault current) over an end cap 50 provided under the lamination stack, thus forming the core 10, each axial housing 12 defined by the longitudinal alignment of the windows 15 of the metallic laminations 11 of the lamination stack receives the adhesive material for affixing the magnet elements 30, before placing the latter in said axial housings 12.

In this construction, after affixing the other end cap 50 and achieving the cure of the adhesive material for retaining the magnet elements 30, the rotor is submitted to a process for removing the excess of material which forms the metallic laminations 11, for example by machining, until their end edges 17 are contained in a circumference with a diameter at minimum equal to that of the circumference circumscribing the finished rotor. Machining of the lamination stack is carried out until the desired final diameter of the rotor is obtained, defining the configuration illustrated in FIG. 4 with the core 10 and polar peripheral portions 20.

The attachment of the caps to the rotor lamination stack and to each other may be obtained by retaining elements 21. such as rivets, bolts, etc. By machining the lamination stack, the end edges 17 of the windows 15 of the metallic laminations 11 Which form said lamination stack are opened to the transversal contour of the rotor and defined in these regions by the cured adhesive material which fills the axial housings 12.

With this construction, each machined lamination of the rotor lamination stack has its end radial portions 12 defined externally to an adjacent magnet element 30 and retained to the central portion 13 by the adhesive material which fills each axial housing 12.

The Provision of one or more radial regions 60 from the peripheral edge 18 of each rotor lamination coinciding with the circumference which determines the desired final diameter of the rotor assures the metallic laminations 11 to have mechanical rigidity during their manufacture and allows them to be industrially produced on a large scale.

Since the radial extension 60 of the metallic lamination illustrated in FIG. 2 is small, said metallic lamination may be stamped simultaneously with the lamination of the stator, which reduces the production time and minimizes material losses when removing excesses.

The solution of a metallic lamination having a reinforcement additional portion 61 illustrated in FIG. 3 has the advantage of having strength, requiring less precision as regards tooling and production process.

In a form of producing the rotor configuration illustrated in FIG. 6, after producing the lamination stack which defines the core 10, the polar peripheral portions 20 are placed and maintained, by appropriate means, radially spaced from the core 10, on the end cap 50 provided under the lamination stack, defining in this spacing an axial housing 12 to be filled with the adhesive material for retaining the magnet elements 30. After this filling has been completed, each axial housing 12 receives a magnet element 30, before the other end cap 50 and the retaining elements are provided, closing the assembly. with this construction, the produced rotor does not require posterior machining, since its diameter may be defined during the relative positioning between the polar peripheral portions 20 and the core 10 for receiving the magnet elements 30.

The adhesive material used between the end caps 50 and the rotor lamination stack may be also provided between the metallic laminations of the lamination stack and has the Function of filling in the gaps between the magnets and the edges of the housings for the magnet elements defined in the rotor; structurally retaining the magnet elements 30 to said housings, compensating the centrifugal and rotational forces to which said magnet elements 30 are submitted; reducing, by a dampening effect or by deformation of the layer of adhesive material, the high thermal stresses (associated to temperature variation of the rotor and to the different coefficient of dilatation of the materials which are interconnected by the adhesive material) Which are generated in the magnet elements 30 and which are usually destructive (causing fragmentation, breaks, release of chips, etc.); as well as maintaining affixed the eventual fragments resulting from breaks or chips from the magnet elements 30. In the formation of the rotor, if there is excess of adhesive material in the axial housings 12, said excess is removed before cure of the adhesive material is achieved. In the case there is no sufficient adhesive material upon introducing the magnet elements 30 inside the axial housings 12, the latter are filled in after said magnet elements have been introduced into the axial housings 12, before said adhesive material has cured.

The end caps 50 glued at the end of the rotor lamination are provided so as to maintain the diameter of said rotor and to guarantee the integrity of the rotor share because, since said magnet elements 30 are fragile components when under traction stresses, the structure formed by the magnet elements and the resin in which they are immersed is not sufficient to assure that the centrifugal force will not cause release or rupture of said magnet elements 30 or even of the polar peripheral portions 20. The end caps 50 determine part of the profile of each rotor housing for retaining a respective magnet element 30 and also act as sealing means for the adhesive material deposited in said housings.

Moreover, the end caps 50 determine a uniform finish to the rotor, compensating the dimensional differences of the rotor components.

The proposed solution allows to obtain a product which has, simultaneously, the characteristics of high energetic efficiency and high reliability and which is adequate to be produced on a large scale with low cost for both the product and its manufacturing process.

What is claimed is:

1. A method for producing a rotor for an electric motor comprising:

providing a stack of a plurality of laminations of a magnetic material;

forming a plurality of windows in said stack of laminations along its axis, each window having an end portion radially of the rotor center, each window having an end to be at the peripheral edge of its respective lamination, there being an intermediate region of a lamination between the ends of two of said windows that are adjacent, each lamination initially having an annular radial extension beyond what is to be its final peripheral edge;

applying an adhesive material into the axial windows;

inserting into each axial window a magnetic element;

mounting an end cap to each end of the lamination stack;

curing the adhesive material;

removing said annular radial extension of the laminations of the stack so that said end portion of each of said plurality of windows is at the peripheral edges of the laminations and form a polar portion between a respective window and the peripheral edges of the laminations of the stack and an intermediate peripheral portion between two adjacent polar peripheral portions, said intermediate peripheral portion having reduced electrical conductibility and reduced magnetic permeability in relation to the core.

2. Method, as in claim 1, further comprising the following steps of:

depositing adhesive material on one face of an end cap to be mounted to the lamination at one end of the stack;

depositing adhesive material between the metallic laminations of the stack; and depositing adhesive material between the lamination at the other end of the stack and another end cap.

3. Method, as in claim 2, further comprising the following steps of:

removing the excess of the adhesive material before said material cures; and affixing fastener elements through said polar peripheral portions of said stack of laminations and through the end caps.

4. A method as in claim 1 wherein each of said windows is concave curved facing the peripheral edge of the lamination.

* * * * *